United States Patent
Han et al.

(10) Patent No.: US 10,850,638 B2
(45) Date of Patent: Dec. 1, 2020

(54) DEVICE FOR ADJUSTING SEAT OF VEHICLE

(71) Applicants: Hyundai Motor Company, Seoul (KR); Kia Motors Corporation, Seoul (KR)

(72) Inventors: Jong Seok Han, Seoul (KR); Seon Chae Na, Gyeonggi-do (KR); Hyun Kyu Moon, Gyeonggi-do (KR); Chan Ho Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 23 days.

(21) Appl. No.: 16/203,798

(22) Filed: Nov. 29, 2018

(65) Prior Publication Data

US 2020/0047642 A1 Feb. 13, 2020

(30) Foreign Application Priority Data

Aug. 10, 2018 (KR) ........................ 10-2018-0093468

(51) Int. Cl.
*B60N 2/04* (2006.01)
*B60N 2/02* (2006.01)
*B60N 2/10* (2006.01)
*B60N 2/16* (2006.01)
*B60N 2/50* (2006.01)
*B60N 2/18* (2006.01)
*A47C 1/024* (2006.01)

(52) U.S. Cl.
CPC ........... *B60N 2/0252* (2013.01); *B60N 2/045* (2013.01); *B60N 2/10* (2013.01); *B60N 2/1615* (2013.01); *A47C 1/0242* (2013.01); *B60N 2/04* (2013.01); *B60N 2/1665* (2013.01); *B60N 2/18* (2013.01); *B60N 2/185* (2013.01); *B60N 2/1842* (2013.01); *B60N 2/501* (2013.01); *B60N 2/502* (2013.01)

(58) Field of Classification Search
CPC .... B60N 2/045; B60N 2/1615; B60N 2/1814; B60N 2/185; B60N 2/1878; B60N 2/18; B60N 2/10; B60N 2/04; B60N 2/501; B60N 2/502; B60N 2/1842; B60N 2/525; A47C 1/0242; A47C 1/0244
USPC ......................................... 297/242, 244, 325
See application file for complete search history.

(56) References Cited

U.S. PATENT DOCUMENTS

| | | | | |
|---|---|---|---|---|
| 1,609,249 A | * | 11/1926 | Hill | B60N 2/10 296/65.05 |
| 2,600,005 A | * | 6/1952 | Kronhaus | B60N 2/163 248/419 |
| 3,006,594 A | * | 10/1961 | Gruendler | B60N 2/045 248/424 |

(Continued)

*Primary Examiner* — Syed A Islam
(74) *Attorney, Agent, or Firm* — Mintz Levin Cohn Ferris Glovsky and Popeo P.C.; Peter F. Corless

(57) ABSTRACT

A device for adjusting a seat of a vehicle is capable of implementing functions including adjusting a position of the seat back and forth, a height of the seat up and down, and tilting or the like by using a plurality of actuators having pistons. The functions of adjusting the position of the seat back and forth, the height of the seat up and down, and tilting or the like are carried out by providing connections between a floor panel and a seat cushion frame through a plurality of actuators and a single link, and selectively moving a piston of each actuator back and forth.

8 Claims, 9 Drawing Sheets

(56) References Cited

U.S. PATENT DOCUMENTS

| | | | | |
|---|---|---|---|---|
| 3,765,720 A * | 10/1973 | Sakai | B60N 2/045 | 297/330 |
| 4,786,107 A * | 11/1988 | Crockett | A61G 5/14 | 297/330 |
| 5,374,022 A * | 12/1994 | Gilmer, Jr. | B63B 29/04 | 248/396 |
| 5,652,704 A * | 7/1997 | Catanzarite | B60N 2/501 | 701/49 |
| 5,975,508 A * | 11/1999 | Beard | B60N 2/501 | 180/89.12 |
| 6,036,266 A * | 3/2000 | Massara | B60N 2/10 | 297/328 |
| 6,082,715 A * | 7/2000 | Vandermolen | B60N 2/501 | 188/267.1 |
| 6,616,117 B2 * | 9/2003 | Gryp | B60N 2/501 | 248/421 |
| 7,770,974 B2 * | 8/2010 | Ott | B60N 2/508 | 297/344.15 |
| 8,342,541 B2 * | 1/2013 | Wurmthaler | B60N 2/501 | 280/5.515 |
| 8,414,054 B2 * | 4/2013 | Komatsubara | B60N 2/1814 | 296/65.02 |
| 8,424,832 B2 * | 4/2013 | Robbins | B60N 2/501 | 180/167 |
| 8,944,380 B2 * | 2/2015 | Ehlers | B64D 11/0696 | 244/122 R |
| 10,025,324 B2 * | 7/2018 | Lorey | G05D 16/028 | |
| 10,266,079 B2 * | 4/2019 | Haller | B60N 2/38 | |
| 10,363,844 B2 * | 7/2019 | Haller | B60N 2/505 | |
| 2004/0075322 A1 * | 4/2004 | Jaeger | B60N 2/0224 | 297/325 |
| 2010/0066142 A1 * | 3/2010 | Gross | B60N 2/42763 | 297/284.1 |
| 2016/0325642 A1 * | 11/2016 | Fitzpatrick | B60N 2/045 | |

* cited by examiner

10,850,638 B2

DEVICE FOR ADJUSTING SEAT OF VEHICLE

CROSS-REFERENCE TO RELATED APPLICATION

This application claims under 35 U.S.C. § 119(a) the benefit of Korean Patent Application No. 10-2018-0093468 filed on Aug. 10, 2018, the entire contents of which are incorporated herein by reference.

BACKGROUND

(a) Technical Field

The present disclosure relates to a device for adjusting a seat of a vehicle, more particularly, to a seat-adjusting device capable of adjusting a position of the seat back and forth, a height of the seat up and down, and tilting or the like by using a plurality of actuators having pistons.

(b) Description of the Related Art

Generally, a seat of a vehicle has been equipped with a behavior mechanism such as front and rear position adjustment, vertical height adjustment, and tilting function or the like for the passenger's posture control and convenience.

However, the behavior mechanism of the seat such as front and rear position adjustment, vertical height adjustment, and tilting function or the like is independently provided, which causes a problem in that the total number of components required for seat adjustment is increased, the assembling structure is very complicated, and the mounting space is insufficient.

In particular, mechanisms for adjusting a position of the seat forward and backwards essentially include sliding tracks mounted on a floor panel, sliding links mounted on the sliding tracks to be movable forward and backwards, a motor for driving the sliding links, and other connecting parts and brackets. Further, the mechanism for adjusting a height of the seat essentially requires a height link and a motor for adjusting the height or the like, and also, the tilting mechanisms essentially require links and a drive motor for tilting or the like.

Similar to the mechanisms for adjusting the position of the seat forward and backwards, the mechanism for adjusting the height of the seat and the tilting mechanisms or the like are independently provided, and in addition, each mechanism typically requires many parts. Further, there are problems in that the manufacturing cost is raised, the assembling structure is very complicated and the assembling workability is inevitably lowered, and in particular, the layout space for installing each mechanism is insufficient.

The above information disclosed in this Background section is only for enhancement of understanding of the background of the disclosure and therefore it may contain information that does not form the prior art that is already known in this country to a person of ordinary skill in the art.

SUMMARY

Accordingly, the present disclosure provides a device for adjusting a seat of a vehicle capable of performing an operation of adjusting a position of the seat back and forth, a height up and down, tilting or the like by connecting between a floor panel and a seat cushion frame via a plurality of actuators and a single link and selectively moving a piston of each actuator forward and backwards.

A device for adjusting a seat of a vehicle according to the present disclosure may include: a support link mounted with a hinge on a floor panel; a first actuator connected between the support link and a front lower surface of a seat cushion frame; a second actuator connected between the floor panel and the first actuator; a third actuator connected between a rear lower surface of the seat cushion frame and the floor panel; and a controller selectively controlling driving of at least one of the first to third actuators in order to carry out at least one of a front and rear position adjustment, an up-and-down height adjustment and tilting of the seat.

The first actuator may include a first cylinder body, a first piston built in the first cylinder body to be movable back and forth, and a first motor mounted at the first cylinder body to provide a forward and backward driving force to the first piston; and a lower portion of the first cylinder body is mounted at the support link, and the first piston is fastened with a hinge to a front lower surface of the seat cushion frame.

Preferably, a rotation pipe may be mounted to be rotatable at the lower portion of the seat cushion frame in order for free rotation between the seat cushion frame and the first piston; and an end portion of the first piston may be connected with the rotation pipe.

Preferably, the support link may include a horizontal bar at which the first cylinder body is fixedly mounted; and a vertical bar bent downwardly from both sides of the horizontal bar to be mounted with a hinge at the floor panel.

The second actuator may be include a second cylinder body, a second piston built in the second cylinder body to be movable back and forth, and a second motor mounted at the second cylinder body to provide a forward and backward driving force to the second piston; and a lower portion of the second cylinder body may be fastened with a hinge to the floor panel Oil hinge engage, and the second piston is fastened with a hinge to the first cylinder body of the first actuator.

The third actuator may include a third cylinder body, a third piston built in the third cylinder body to be movable back and forth, and a third motor mounted at the third cylinder body to provide a forward and backward driving force to the third piston; and a lower portion of the third cylinder body is fastened with a hinge to the floor panel and the third piston may be fastened with a hinge to a rear lower surface of the seat cushion frame.

The forward movement position adjustment of the seat may be achieved by the forward movement operation of the first piston of the first actuator, the operation that the first actuator is pulled forward to be angle-rotated by the backward movement of the second piston of the second actuator, and the operation that the third piston of the third actuator moves backwards to be angle-rotated forward, which are simultaneously performed; and the backward movement position adjustment of the seat may be achieved by the backward movement operation of the first piston of the first actuator, the operation that the first actuator is pushed backwards to be angle-rotated by the forward movement of the second piston of the second actuator, and the operation that the third piston of the third actuator moves forward to be angle-rotated backwards, which are simultaneously performed.

The height rising adjustment of the seat may be achieved by the forward movement operation of the first piston of the first actuator, the operation that the first actuator is angle-rotated while pushed backwards by the forward movement of the second piston of the second actuator, and the operation that the third piston of the third actuator is angle-rotated forward while moving forward, which are simultaneously performed; and the height lowering adjustment of the seat may be achieved by the backward movement operation of the first piston of the first actuator, the operation that the first actuator is pulled forward to be angle-rotated by the backward movement of the second piston of the second actuator, and the operation that the third piston of the third actuator is angle-rotated rearward while moving backwards, which are simultaneously performed.

The tilting adjustment of the seat may be achieved by the forward movement operation of the second piston of the second actuator, the operation that the first actuator is pushed backwards to be angle-rotated by the forward movement of the second piston, and the operation that the third actuator is angle-rotated backwards, which are simultaneously performed.

Through the above-mentioned problem solving means, the present disclosure provides the following effects.

First, it is possible to simplify the structure and reduce the number of parts by achieving the operations of adjusting the position of the seat back and forth, adjusting the height up and down, tilting, etc., by operating a plurality of actuators connected between the floor panel and the seat cushion frame, and improve the assembling work through simple assembling structure.

Second, since the parts for adjusting the position of the seat back and forth, adjusting the height up and down and tilting or the like are limited to only a plurality of actuators and a single link, it is possible to secure a sufficient layout space for seat adjustment, and also, it is possible to prevent the interference between the parts and easily secure the space of the rotation trace when rotating a swivel seat applicable to an autonomous vehicle in the future.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given herein below by way of illustration only, and thus are not limitative of the present disclosure, and wherein.

Figure 1A:
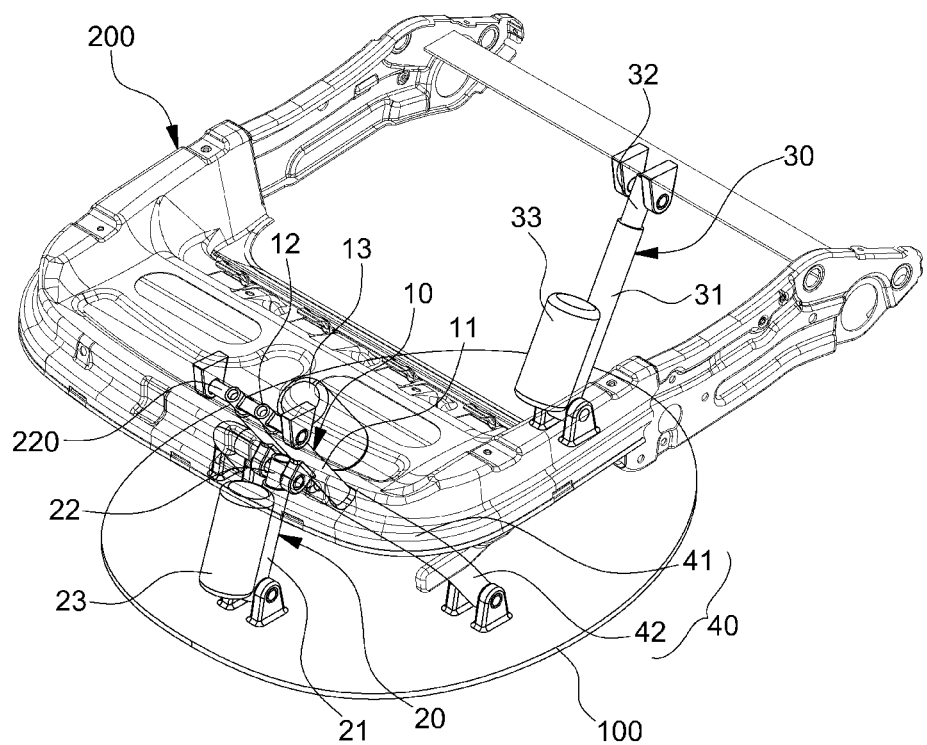
FIG. 1a and FIG. 1b are perspective views showing a device for adjusting a seat of a vehicle according to the present disclosure.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1B:
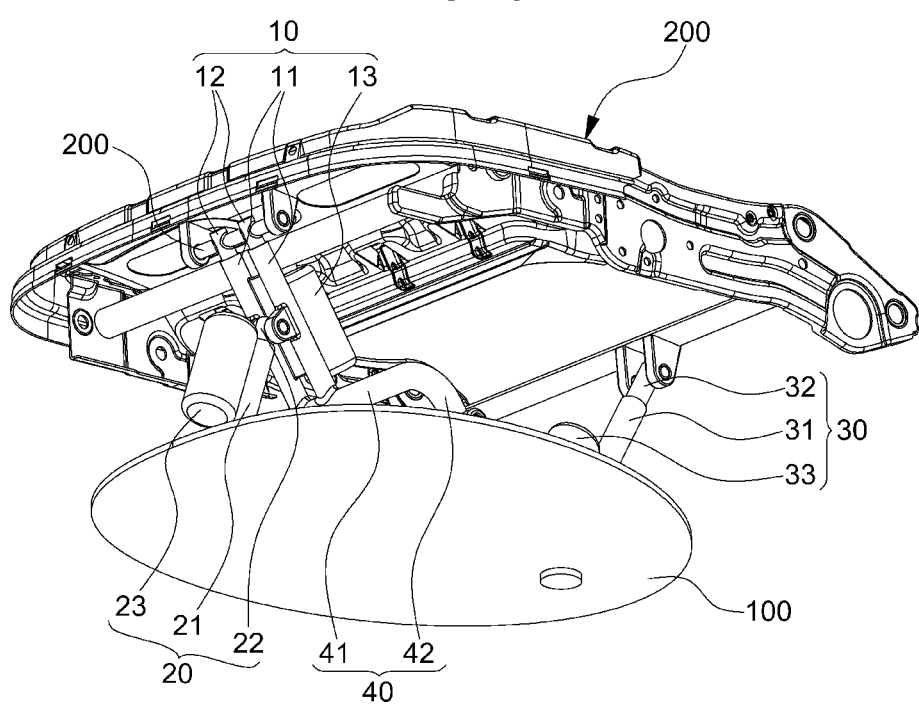
Figure 2:
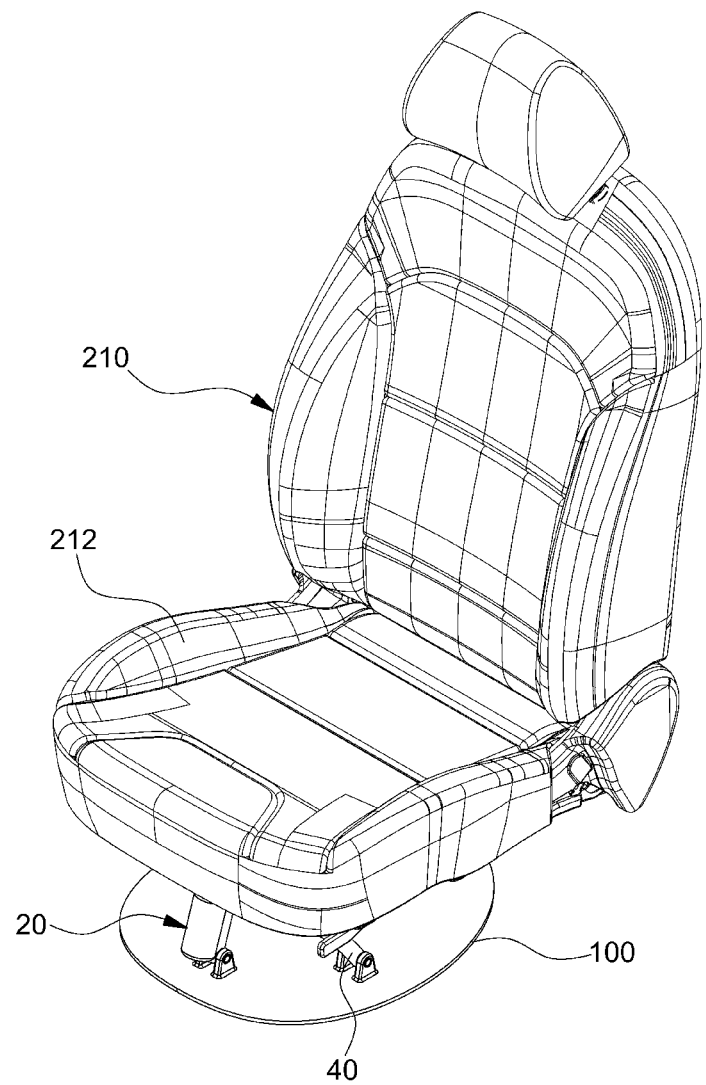
FIG. 2 is a perspective view showing the appearance of the seat in which the device for adjusting the seat of the vehicle according to the present disclosure is installed.

FIG. 1a, FIG. 1b, and FIG. 2 are perspective views showing a device for adjusting a seat of a vehicle according to the present disclosure, where reference numeral 100 indicates a floor panel, and reference numeral 200 indicates a seat cushion frame.

In FIG. 1a, FIG. 1b, and FIG. 2, the floor panel 100 shows only a partial area where the device for adjusting the seat of the vehicle is installed and refers to a panel that can be mounted on either an indoor floor panel or an indoor floor of the vehicle.

The seat cushion frame 200 is a skeleton of a seat cushion 212 constituting a seat 210 and is embedded in the seat cushion 212 in a predetermined manner.

The present disclosure may connect between the floor panel 100 and the seat cushion frame 200 with three or more actuators, and implement the operation of adjusting a position of the seat back and forth and an up-and-down height, and tilting the seat by selective actuation of each actuator.

As a preferable exemplary embodiment of the present disclosure, the floor panel 100 and the seat cushion frame 200 may be connected with first, second and third actuators 10, 20, and 30.

The first actuator 10 may be connected between a support link 40 mounted with a hinge on the floor panel 100 and the front lower surface of the seat cushion frame 200.

In particular, the first actuator 10 may be composed of a first cylinder body 11, a first piston 12, which is embodied in the first cylinder body 11 so as to be movable back and forth, and a first motor 13, which is mounted on the first cylinder body 11 to provide a forward and backward force to the first piston 12.

Further, the support link 40 may be composed of a horizontal bar 41 with a first cylinder body 11 fixedly mounted thereon and a vertical bar 42 bent downwardly from both ends of the horizontal bar 41 and mounted with a hinge on the floor panel 100.

Particularly, the lower portion of the first cylinder body 11 of the first actuator 10 may be fixedly mounted on the support link 40 in a welding manner or the like and the first piston 12 is fastened with a hinge to the front lower surface of the seat cushion frame 200.

Preferably, the first cylinder body 11 of the first actuator 10 and the vertical bar 42 of the support link 40 may be in line, as viewed from the side, so as to have the same angular rotation trace.

Thus, the first actuator 10 may be arranged with the support link 40 upwardly inclined toward the front or vertically upright.

On the other hand, a rotation pipe 220 for free hinge engaging with the first piston 12 may be disposed along the width direction of the seat and mounted to be rotatable at a lower portion (the portion where the first piston of the first actuator is attached) of the seat cushion frame 200, and an end portion of the first piston 12 may be connected with the rotation pipe 220, so that the rotation pipe 220 and the first piston 12 may be arranged in a T-shape.

Thus, the end portion of the first piston 12 is connected with the rotation pipe 220, so that free rotation (i.e., substantially or relatively free rotation) between the seat cushion frame 200 and the first piston 12 becomes possible.

The second actuator 20 may be connected between the floor panel 100 and the first actuator 10.

The second actuator 20 may be composed of a second cylinder body 21, a second piston 22 built in the second cylinder body 21 to be movable back and forth, and a second motor 23 mounted at the second cylinder body 21 to provide a forward and backward driving torque to the second piston 22.

The lower portion of the second cylinder body 21 of the second actuator 20 provided like this may be fastened with a hinge on the floor panel 100, and a front end portion of the second piston 22 may be fastened with a hinge to the first cylinder body 11 of the first actuator 10.

In particular, the second actuator 20 may be disposed to be inclined upward toward the rear unlike the first actuator 10.

The third actuator 30 may be connected between the rear lower surfaces of the floor panel 100 and the seat cushion frame 200.

Likewise, the third actuator 30 may be composed a third cylinder body 31, a third piston 32 movably built in the third cylinder body 31 and a third motor 33 mounted on the third cylinder body 31 to provide a forward and backward driving force.

Thus, a lower portion of the third cylinder body 31 may be fastened with a hinge to the floor panel 100, and the third piston 32 may be fastened with a hinge to a rear lower surface of the seat cushion frame 200.

In particular, the third actuator 30 20 may be disposed to be inclined upward toward the rear.

Although the first to third actuators 10, 20, and 30 have been described as a conventional electric cylinder having a mechanism for transmitting driving torque of the motor to the piston, a hydraulic cylinder or a pneumatic cylinder can also be used.

Meanwhile, the device for adjusting the seat of the present disclosure may include a controller (not shown) for selectively controlling at least one of the first to third actuators 10, 20, and 30 for adjusting the position of the seat back and forth, the height up and down, and tilting or the like, and the control signal of the controller can control the forward and backward moving length of the piston of each actuator 10, 20, and 30 to be equal or different with each other.

Herein, various operation examples of the device for adjusting the seat of the present disclosure having the above configuration will be described as follows.

Adjusting the Seat Back and Forth

Figure 3:
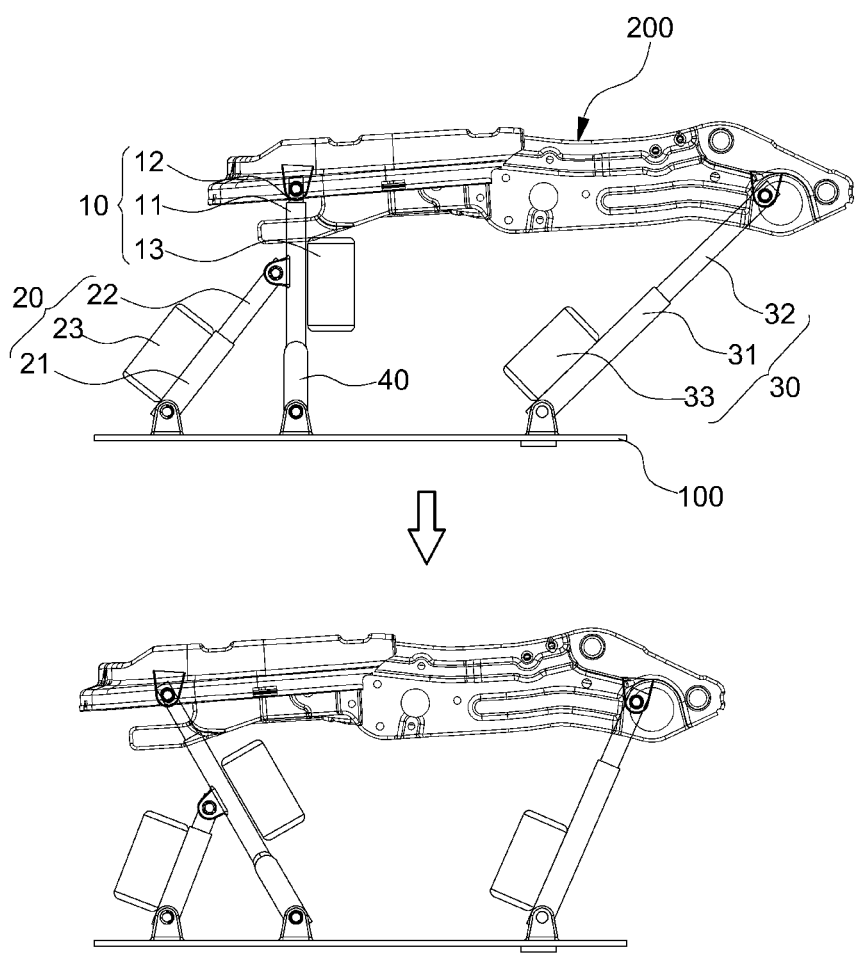
FIG. 3 and FIG. 4 are side views showing a front and rear position adjustment operation of the device for adjusting the seat of the vehicle according to the present disclosure.
Figure 4:
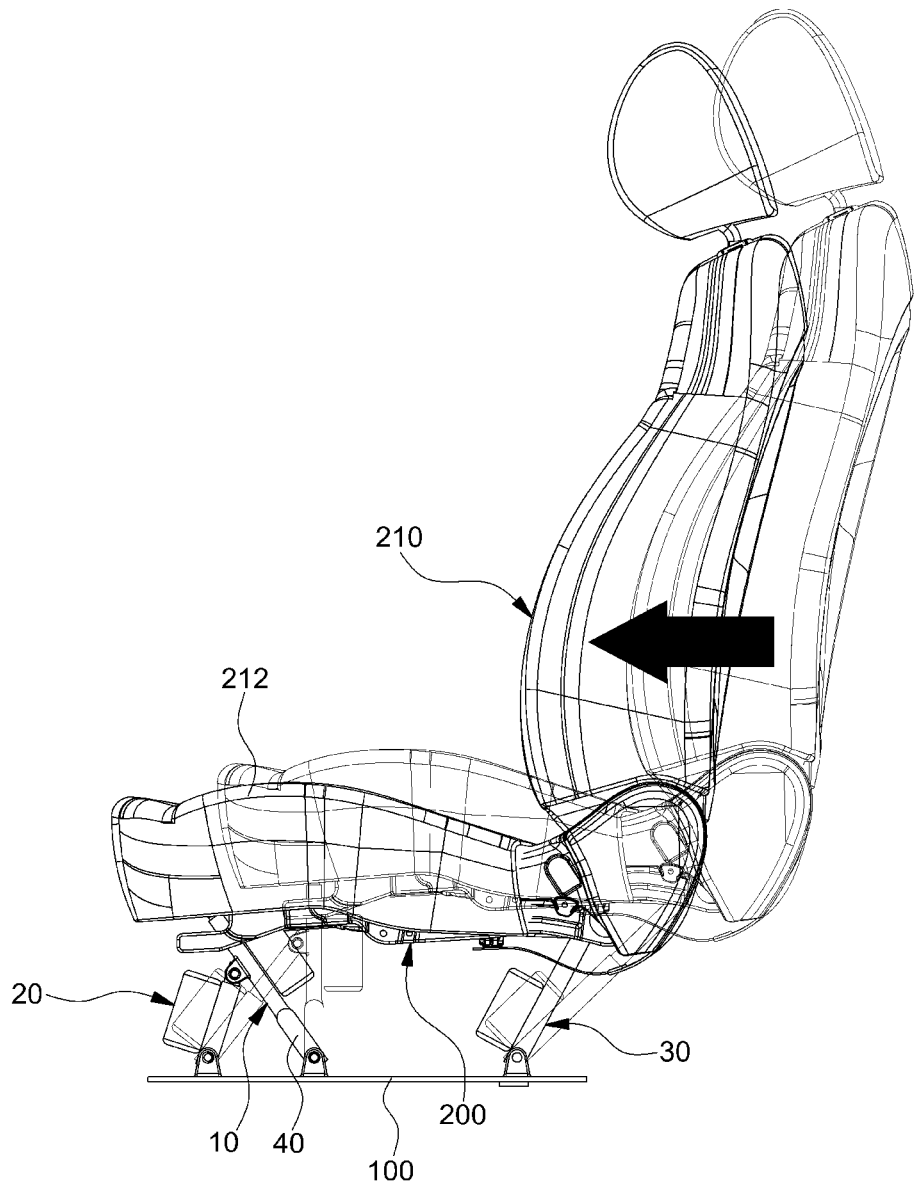

FIG. 3 and FIG. 4 show a front and rear position adjustment operation of the device for adjusting the seat of the vehicle according to the present disclosure.

The adjusting of the seat back and forth can be achieved by sliding the seat cushion frame to the front or rear.

In particular, a piston advance drive signal is transmitted from the controller to the first actuator 10 in order to move the seat cushion frame 200 forward, a piston backward drive signal is transmitted to the second actuator 20, and a piston backward drive signal is transmitted to the third actuator 30.

Thus, as shown in FIG. 3, for adjusting the seat back and forth, the forward movement operation of the first piston 12 of the first actuator 10, the backward movement operation of the second piston 22 of the second actuator 20 and the backward movement operation of the third piston 32 of the third actuator 30, which are simultaneously performed.

In particular, the forward movement position adjustment of the seat may be achieved by the forward movement operation of the first piston 12 of the first actuator 10, the operation that the first actuator 10 is pulled forward to be angle-rotated by the backward movement of the second piston 22 of the second actuator 20, and the operation that the third piston 32 of the third actuator 30 moves backwards to be angle-rotated forward, which are simultaneously performed.

Further, since the first piston 12 is connected freely rotatable with respect to the front lower of the seat cushion frame 200 via a rotation pipe 220, the forward movement of the first piston 12 and the backward movement of the second piston 22 causes the first actuator 10 to tilt forward and simultaneously the seat cushion frame 200 is pulled forward, and simultaneously the third piston 32 fastened with a hinge to the rear lower surface of the seat cushion frame 200 moves backwards to support the lower portion of the seat cushion frame 200 to prevent a change in the height of the seat cushion frame 200.

On the other hand, the backward movement position adjustment of the seat is achieved by the backward movement operation of the first piston 12 of the first actuator 10, the operation that the first actuator is pushed backwards to be angle-rotated by the forward movement of the second piston 22 of the second actuator 20, and the third piston 32 of the third actuator 30 moves forward to be angle-rotated are simultaneously performed.

That is, the backward position adjustment of the seat is achieved by the backward movement operation of the first piston 12 of the first actuator 10, the operation that the first actuator 10 is angle-rotated while pushed backwards by the forward movement of the second piston 22 of the second actuator 20, and the operation that the third piston 32 of the third actuator 30 moves forward and, at the same time, the third actuator 30 is angle-rotated rearward, which actions are simultaneously performed.

Adjusting the Seat Up and Down

Figure 5:
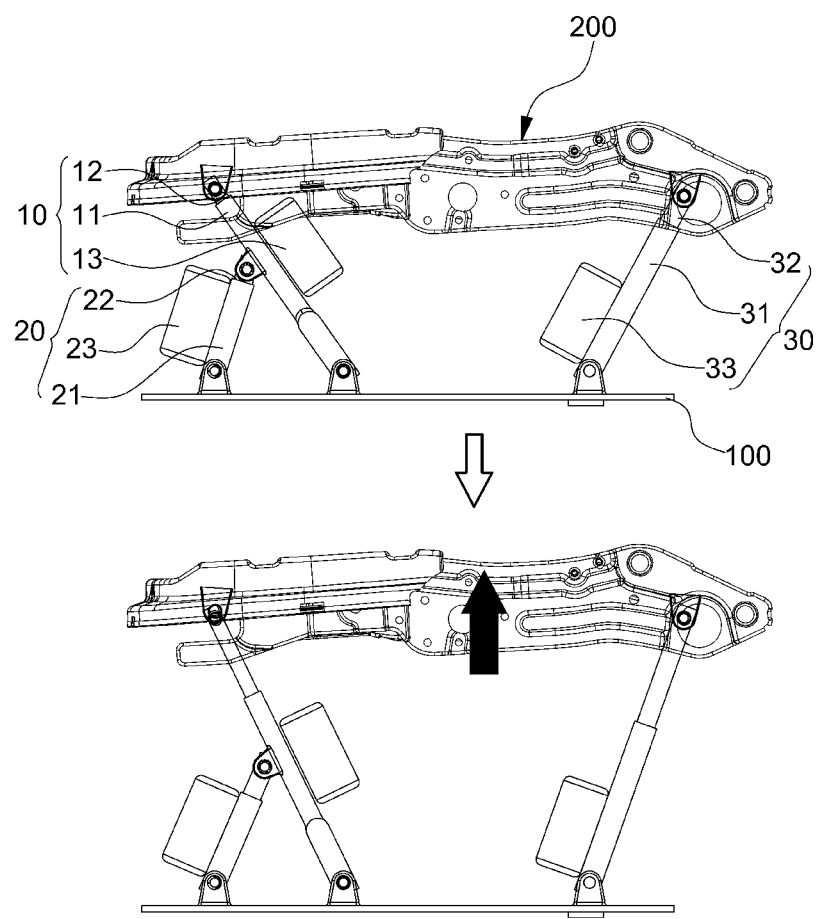
FIG. 5 and FIG. 6 are side views showing an up-and-down height adjustment operation of the device for adjusting the seat of the vehicle according to the present disclosure.
Figure 6:
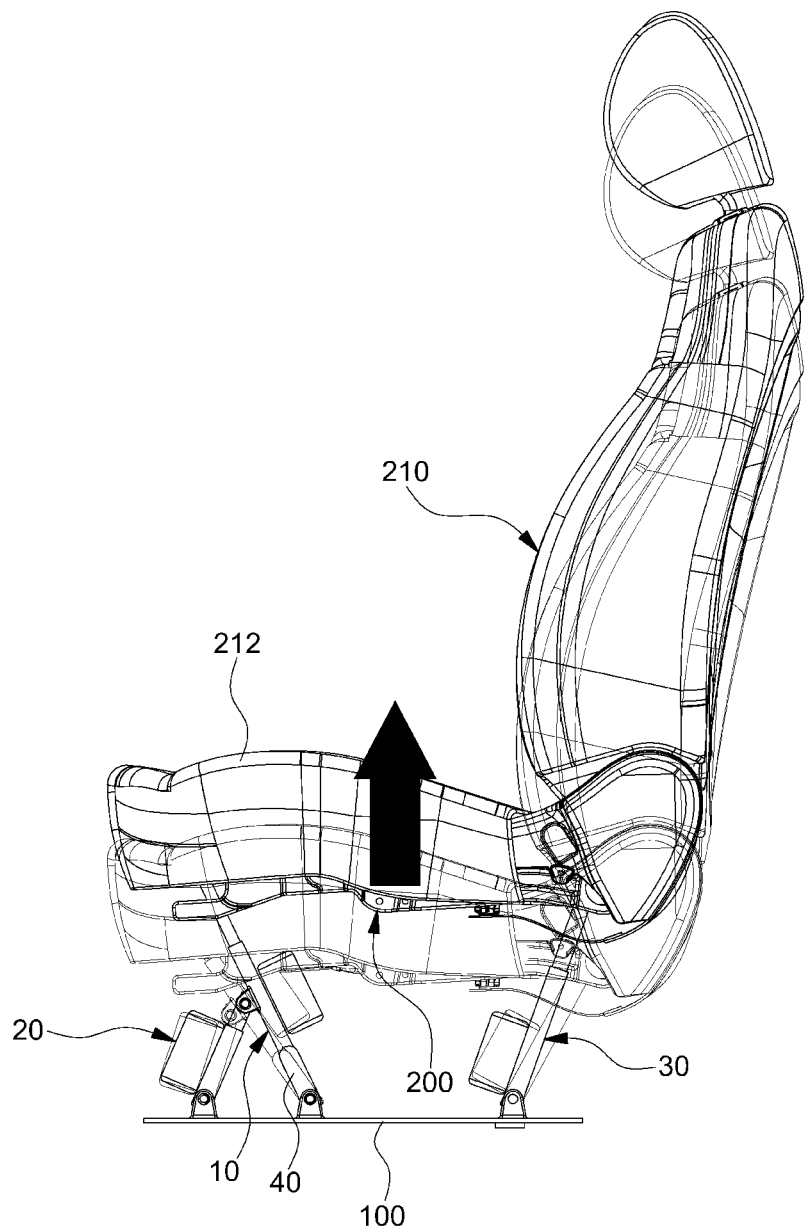

FIG. 5 and FIG. 6 are side views showing an up-and-down height adjustment operation of the device for adjusting the seat of the vehicle according to the present disclosure.

The up-and-down height adjustment of the seat may be made by lifting the seat cushion frame upward or downward.

In particular, in order to move the seat cushion frame 200 in the upper direction, the piston forward driving signal is transmitted from the controller to the first actuator 10, the piston forward driving signal is transmitted to the third actuator 30, and the forward driving signal of the controller is transmitted to the second actuator 20.

Thus, as shown in FIG. 5, in order to carry out the up-and-down height adjustment of the seat, the first piston 12 of the first actuator 10 moves forward and simultaneously the third actuator 30 of the third piston 32 moves forward to push the seat cushion frame 200 upwardly, so that the height of the seat is adjusted upwardly.

In particular, the height rising adjustment of the seat may be achieved by the forward movement operation of the first piston 12 of the first actuator 10, the operation that the first actuator 10 is angle-rotated while pushed backwards by the forward movement of the second piston 22 of the second actuator 20, and the operation that the third piston 32 of the third actuator 30 is angle-rotated forward while moving forward, which actions are simultaneously performed.

Conversely, when the first piston 12 of the first actuator 10 is operated backwards and simultaneously the third piston 32 of the third actuator 30 is operated backwards to pull down the seat cushion frame 200, so that the height of the seat is lowered.

That is, the height lowering adjustment of the seat may achieved by the backward movement operation of the first piston 12 of the first actuator 10, the operation that the first actuator 10 is pulled forward to be angle-rotated by the backward movement of the second piston 22 of the second actuator 20, and the operation that the third piston 32 of the third actuator 30 is angle-rotated rearward while moving backwards, which actions are simultaneously performed.

Seat Tilting Operation

Figure 7:
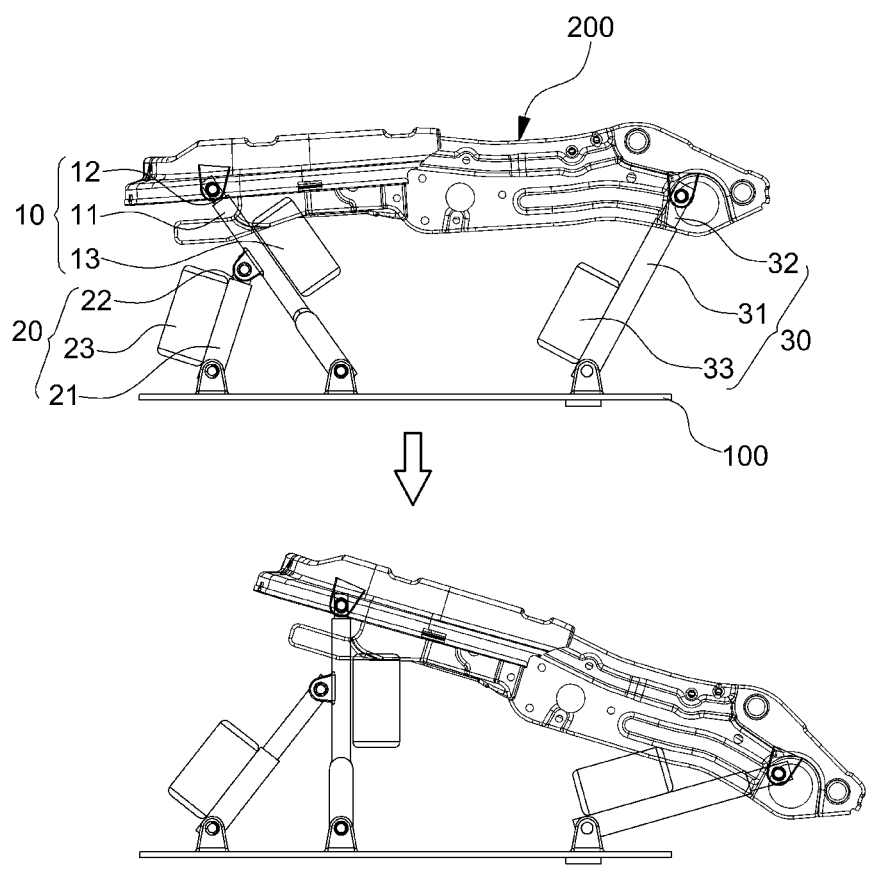
FIG. 7 and FIG. 8 are side views showing a tilting operation of the device for adjusting the seat of the vehicle according to the present disclosure.
Figure 8:
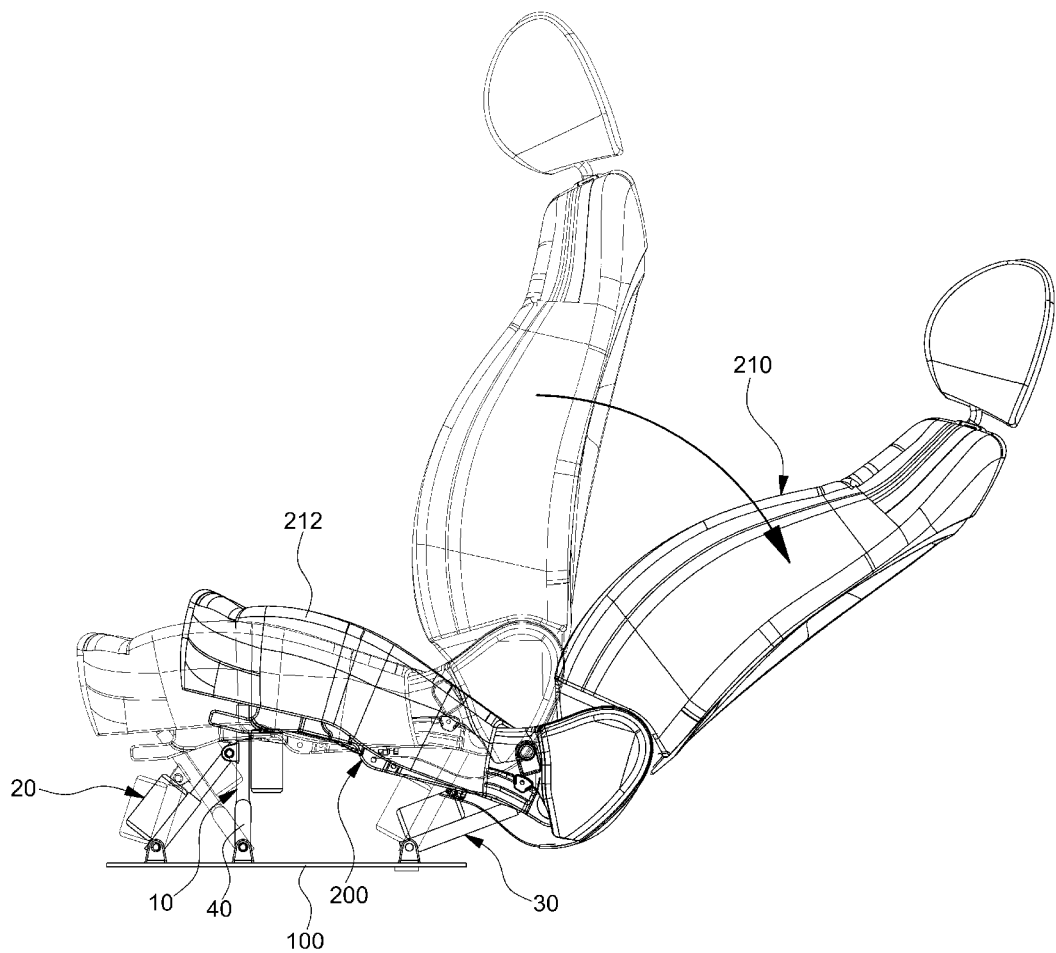

FIG. 7 and FIG. 8 are side views showing a tilting operation of the device for adjusting the seat of the vehicle according to the present disclosure.

The seat tilting operation may be achieved by tilting the seat cushion frame backwards.

In particular, in order to tilt the seat cushion frame 200, the controller transmits the piston forward drive signal only to the second actuator 20, and the first actuator 10 and the third actuator 30 do not operate because the drive signal of the controller is not transmitted.

Thus, as shown in FIG. 7, in order for the seat tilting adjustment, the second piston 22 of the second actuator 20 is operated forward and the first actuator 10 is pushed forward by the forward movement of the second piston 22 while being angle-rotated backwards, and simultaneously the third actuator 30 is angle-rotated backwards.

In particular, the tilting adjustment of the seat may be achieved by the forward operation movement of the second piston 22 of the second actuator 20, the operation that the first actuator 10 is pushed to be angle-rotated backwards by the forward movement of the second piston 22, and the operation that the third actuator 30 is angle-rotated backwards, which actions are simultaneously performed.

In particular, the second actuator 20 is arranged diagonally toward the rear while supporting the first actuator 20.

Therefore, the forward actuating force of the second piston 22 acts on the first actuator 10 so that the first actuator 10 is pushed to be angle-rotated, but the first actuator 10 is angle-rotated backwards around the hinge fastening point between the floor panel 100 and the first cylinder body 11 and the hinge fastening point between the rotation pipe 220 of the seat cushion frame 200 and the first piston 12, so that the front end portion of the seat cushion frame 200 is pivotally moved toward the rear.

At the same time, the rear end portion of the seat cushion frame 200 also is pivotally moved toward the rear around the hinge fastening point between the third cylinder body 31 of the third actuator 30 and the floor panel 100 and the hinge fastening point between the seat cushion frame 200 and the third piston 32, so that the height thereof is lowered.

Similarly, the tilting of the seat cushion frame 200 is performed only by driving the first actuator 10, so that the tilting adjustment of the entire seat can be facilitated.

As described above, the present disclosure uses a plurality of actuators connected between the floor panel and the seat cushion frame to adjust the position of the seat back and forth, adjust the height up and down, and tilting or the like, so that it is possible to simplify the configuration and reduce the number of parts compared to existing complex mechanism configurations, improve the assembling workability through the simple assembly structure, and secure a sufficient layout space for seat adjustment, thereby easily ensuring the swivel trace space of the swivel seat to be applied to the autonomous vehicle in the future.

What is claimed is:

1. A device for adjusting a seat of a vehicle, comprising:
a support link mounted with a first hinge on a floor panel;
a first actuator connected between the support link and a front lower surface of a seat cushion frame, the first actuator including a first cylinder body, a first piston built in the first cylinder body to be movable back and forth, and a first motor mounted at the first cylinder body to provide a forward and backward driving force to the first piston;
a second actuator connected between the floor panel and the first actuator;

a third actuator connected between a rear lower surface of the seat cushion frame and the floor panel; and a controller selectively controlling driving of at least one of the first to third actuators in order to carry out at least one of a front and rear position adjustment, an up-and-down height adjustment and tilting of the seat, wherein the second actuator includes a second cylinder body, a second piston built in the second cylinder body to be movable back and forth, and a second motor mounted at the second cylinder body to provide a forward and backward driving force to the second piston, and wherein a lower portion of the second cylinder body is fastened with a second hinge to the floor panel, and the second piston is fastened with a third hinge to the first cylinder body of the first actuator.

2. The device for adjusting the seat of the vehicle of claim 1, wherein:

a lower portion of the first cylinder body is mounted at the support link, and the first piston is fastened with a hinge to a front lower surface of the seat cushion frame.

3. The device for adjusting the seat of the vehicle of claim 2, wherein:

a rotation pipe is mounted to be rotatable at a lower portion of the seat cushion frame in order to achieve free rotation between the seat cushion frame and the first piston; and an end portion of the first piston is connected with the rotation pipe.

4. The device for adjusting the seat of the vehicle of claim 2, wherein the support link comprises:

a horizontal bar at which the first cylinder body is fixedly mounted; and a vertical bar bent downwardly from both sides of the horizontal bar to be mounted with a hinge at the floor panel.

5. The device for adjusting the seat of the vehicle of claim 1, wherein:

the third actuator includes a third cylinder body, a third piston built in the third cylinder body to be movable back and forth, and a third motor mounted at the third cylinder body to provide a forward and backward driving force to the third piston; and a lower portion of the third cylinder body is fastened with a hinge to the floor panel and the third piston is fastened with a hinge to a rear lower surface of the seat cushion frame.

6. The device for adjusting the seat of the vehicle of claim 1, wherein:

forward movement position adjustment of the seat is achieved by a forward movement operation of a first piston of the first actuator, an operation that the first actuator is pulled forward to be angle-rotated by backward movement of a second piston of the second actuator, and an operation that a third piston of the third actuator moves backwards to be angle-rotated forward, which are simultaneously performed; and backward movement position adjustment of the seat is achieved by a backward movement operation of the first piston of the first actuator, an operation that the first actuator is pushed backwards to be angle-rotated by the forward movement of the second piston of the second actuator, and an operation that the third piston of the third actuator moves forward to be angle-rotated backwards, which are simultaneously performed.

7. The device for adjusting the seat of the vehicle of claim 1, wherein:

a height rising adjustment of the seat is achieved by forward movement operation of a first piston of the first actuator, an operation that the first actuator is angle-rotated while pushed backwards by forward movement of a second piston of the second actuator, and an operation that a third piston of the third actuator is angle-rotated forward while moving forward, which are simultaneously performed; and a height lowering adjustment of the seat is achieved by backward movement operation of the first piston of the first actuator, an operation that the first actuator is pulled forward to be angle-rotated by backward movement of the second piston of the second actuator, and an operation that a third piston of the third actuator is angle-rotated rearward while moving backwards, which are simultaneously performed.

8. The device for adjusting the seat of the vehicle of claim 1, wherein a tilting adjustment of the seat is achieved by forward movement of a second piston of the second actuator, an operation that the first actuator is pushed backwards to be angle-rotated by the forward movement of the second piston, and an operation that the third actuator is angle-rotated backwards, which are simultaneously performed.

* * * * *